United States Patent [19]

Sheem

[11] Patent Number: 4,479,715

[45] Date of Patent: Oct. 30, 1984

[54] OPTICAL ROTATION-SENSING INTERFEROMETER WITH (3×3)-(2×2) DIRECTIONAL COUPLER

[76] Inventor: Sang K. Sheem, 3105 Tam O'Shanter, Richardson, Tex. 75080

[21] Appl. No.: 356,590

[22] Filed: Mar. 9, 1982

[51] Int. Cl.³ .......................... G01C 19/64; G02B 5/14
[52] U.S. Cl. .................................. 356/350; 350/96.15
[58] Field of Search ...................... 356/350; 350/96.15, 350/96.16

[56] References Cited

U.S. PATENT DOCUMENTS 3,102,953  9/1963  Wallace ................................ 356/350
4,013,365  3/1977  Vali et al. ............................ 356/350

OTHER PUBLICATIONS

Bulmer, Sheem, Moller and Burns, "High-Efficiency Flip-Chip Coupling Between Single-Mode Fibers and LiMbO₃ Channel Waveguides" Appl. Phys. Lett., 37, pp. 351–353, 1980.
Rashleigh and Burns, "Dual-Input Fiber-Optic Gyroscope", Optics Letters, vol. 5, No. 11, p. 482, Nov. 1980.
Sang K. Sheem, "Fiber-Optic Gyroscope with (3×3) Directional Coupler", Appl. Phys. Lett. 37(10), Nov. 15, 1980.
Sang K. Sheem, "Optical Fiber Interferometers with (3×3) Directional Couplers: Analysis", Jr. Appl. Phys. 52(6), Jun. 1981.
Sang K. Sheem, "Optical Fiber Gyroscope with (3×3) Directional Coupler, " U.S. Patent Appl. No. 320,999.
W. K. Burns, "Fiber Optic Rotation-Sensing Interferometer with (3×2) Coupler", filed Feb. 25, 1982, Navy Case No. 65,127.

Primary Examiner—Vincent P. McGraw

[57] ABSTRACT

A Sagnac rotation-sensing interferometer with a fiber-optic loop for providing a closed optical path in which counter-propagating light beams are phase shifted due to the Sagnac effect and with an otical coupler for splitting an input beam into the counter-propagating light beams in the fiber-optic loop and for providing for interference between the output beams of the fiber-optic loop. The optical coupler includes a (3×3) coupler with two first output waveguides symmetrically disposed about an input waveguide for splitting the input beam into equal components and a (2×2) coupler with two second output waveguides adjacently disposed for providing interference between the output beams. The second output waveguides of the (2×2) coupler couple the first otput waveguides of the (3×3) coupler to the end of the fiber-optic loop.

9 Claims, 1 Drawing Figure

OPTICAL ROTATION-SENSING INTERFEROMETER WITH (3×3)-(2×2) DIRECTIONAL COUPLER

BACKGROUND OF THE INVENTION

The present invention relates generally to Sagnac rotation-sensing ring interferometers and more particularly to a Sagnac rotation-sensing ring interferometer which operates at its maximum sensitivity point for small rates of rotation ($\Omega$).

The Sagnac ring interferometer, which employs a long single-mode fiber-optic loop, has shown promise as a passive gyroscope for navigational purposes. The properties of Sagnac fiber-optic gyroscopes are described in an article by Rashleigh and Burns, entitled "Dual-Input Fiber-Optic Gyroscope", Optics Letters, Vol. 5, No. 11, p. 482, Nov. 1980. Typical Sagnac fiber-optic gyroscopes include means for introducing light beams into both ends of the fiber-optic loop and means for measuring the relative phase shift of the light beams exiting the fiber-optic loop in order to determine the rate of rotation ($\Omega$) in the plane of the fiber-optic loop. An optical coupler splits an incoming light beam into two counter-propagating beams in the fiber-optic loop and provides for interference between the light beams exiting the fiber-optic loop.

The interferometer operates at maximum sensitivity, or quadrature, for small rates of rotation when the output beams of the optical coupler have equal intensity at zero rotation rate. Prior art couplers having two input terminals and two output terminals, (2×2), do not operate at quadrature unless a non-reciprocal $\pi/2$ phase shift is induced into the optical path of the beams. The means needed to induce the non-reciprocal $\pi/2$ phase shift increase the complexity and susceptibility to noise of prior art interferometers using (2×2) couplers.

A (3×3) coupler as disclosed, for example, in U.S. patent application Ser. No. 320,999 by S. K. Sheem operates at quadrature for small rates of rotation, but the increased separation of the optical paths providing interference between the light beams exiting the fiber-optic loop decreases the coupling between the beams and requires a longer coupling length. Attempts to arrange the optical paths in non-planar configurations to increase coupling destroys the symmetry required for fabrication by integrated optics techniques.

OBJECTS OF THE INVENTION

Accordingly an object of the invention is to provide a Sagnac rotation-sensing ring interferometer which operates at maximum sensitivity at near-zero rotation rates. A further object of the invention is to provide for a high degree of coupling between the phase-shifted output beams exiting the fiber-optic to loop thereby to increase the sensitivity of a Sagnac rotation-sensing interferometer and to provide for a symmetric coupler configuration facilitating fabrication of the optical coupler of a Sagnac rotation-sensing ring interferometer by integrated optics techniques.

SUMMARY OF THE INVENTION

The above and other object are realized in the present invention by providing a Sagnac rotation-sensing ring interferometer with an optical coupler having a novel structure incorporating both a (3×3) and a (2×2) coupler. The (3×3) coupler provides for symmetric splitting of the input beam into two counter-propagating beams in the fiber-optic loop so that the interferometer operates at quadrature, or maximum sensitivity, for small $\Omega$. The (2×2) coupler provides for strong interference between the Sagnac phase-shifted output beams from the fiber-optic loop thereby increasing the sensitivity of the interferometer. The coupler may comprise channel waveguides fabricated on the planar surface of a dielectric thereby providing for fabrication by precise integrated optics techniques.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
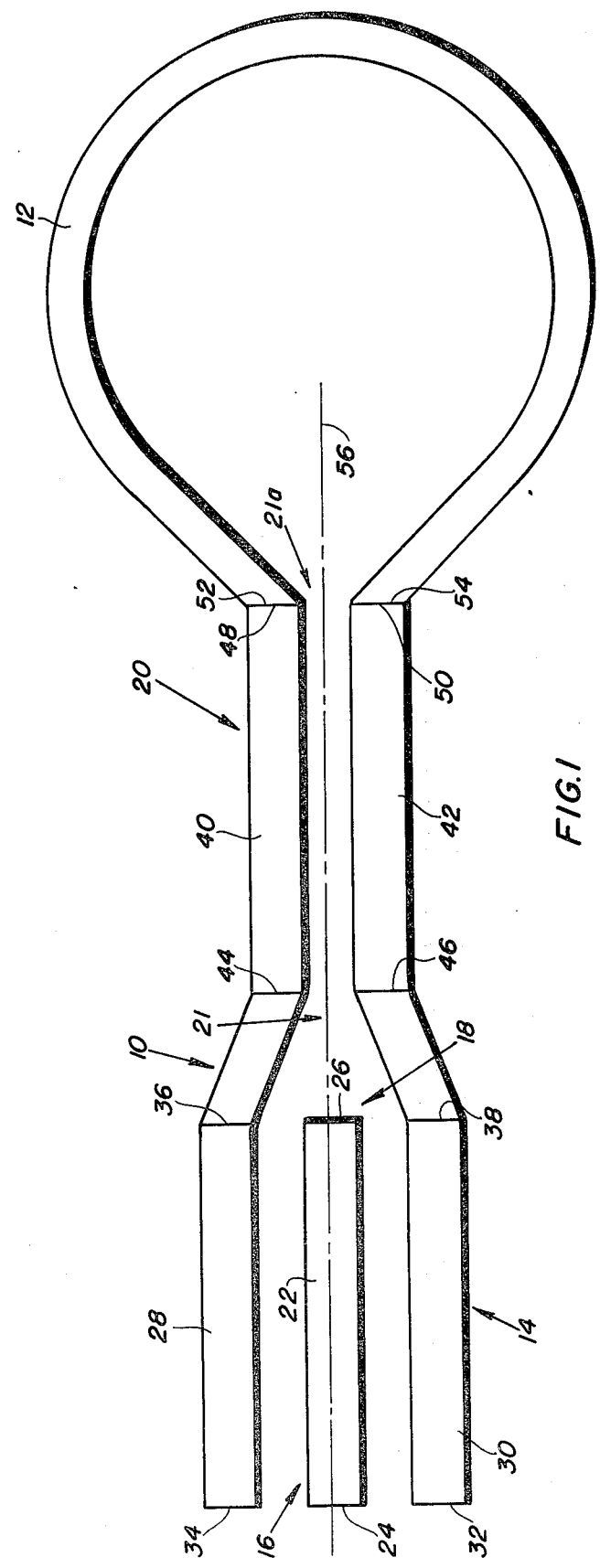
FIG. 1 is a schematic diagram depicting the waveguide structure of the present invention.

Referring now to the drawings wherein like reference characters designate like or corresponding parts throughout the views, FIG. 1 depicts the Sagnac interferometer utilized in one embodiment of the present invention. The interferometer includes an optical coupler 10 and a fiber-optic loop 12. Although the coupler 10 depicted in FIG. 1 is a single element, the description of the operation and structure of the coupler is facilitated by dividing it into two regions. The first region is a (3×3) coupler 14, i.e. a coupler having an input side 16 with three input terminals and an output side 18 with three output terminals; the second region is a (2×2) coupler 20 with an input side 21 and an output side 21a each having two terminals.

The (3×3) coupler includes an input waveguide 22, with an input terminal 24 and an output terminal 26, and two first output waveguides 28 and 30, with input terminals 32 and 34 and intermediate output terminals 36 and 38, respectively, wherein the input waveguide 22 is disposed between the output waveguides 28 and 30.

The degree to which a light beam in one waveguide is coupled, via evanescent coupling, into another waveguide is a function of KL where K is the coupling co-efficient determined by the geometry and materials of the coupler and L is the distance over which the waveguides are coupled. If $K_1$ is the coupling co-efficient between the input 22 and either of the first output waveguides 28 or 30 and $K_2$ is the coupling co-efficient between the first output waveguides 28 and 30, then $K_2 < K_1$ since the distance between the output waveguides 28 and 30 is greater than the distance between the input waveguide 22 and either first output waveguide 28 or 30.

The (2×2) coupler 20 includes two second output waveguides 40 and 42 with intermediate input terminals 44 and 46 and output terminals 48 and 50. The (2×2) coupler 20 is characterized by a coupliing co-efficient $K_3$. The distance between the second output waveguides 40 and 42 in the (2×2) coupler 20 is less than the distance between the first output waveguides 28 and 30 in (3×3) coupler 14 so that $K_2 < K_3$. The ends 52 and 54 of the fiber-optic loop 12 are optically coupled to the output terminals 48 and 50 of the second output waveguides 40 and 42. The input waveguide 22, first output waveguides 28, 30 and second output waveguides 40, 42 are disposed in a plane about an axis of symmetry 56 passing through the center of the input waveguide 22.

The waveguides of the optical coupler 10 are fabricated on a dielectric substrate by precise integrated optics techniques as illustrated in an article by Bulmer, Sheem, Moeller and Burns entitled "High-Efficiency Flip-Chip Coupling Between Single-Mode Fibers and LiNbO$_3$ Channel Waveguides", Appl. Phys. Lett., 37, pp. 351-353, (1980).

The manner in which the optical coupler 10 depicted in FIG. 1 functions is described below. The mathematical formulae set out below are more fully explained in the article by Sheem, S. entitled "Optical Fiber Interferometers with (3×3) Directional Couplers: Analysis", J. App. Phys., 52(6), pp. 3865, June 1981 which is hereby incorporated by reference.

The input terminal 24 of the input waveguide 22 of the (3×3) coupler 14 is adapted to receive an input light beam from an external light source (not shown) such as a laser. The input light beam propagates through the input waveguide 22 and part of the input light beam is coupled into the first output waveguides 28 and 30. Since $K_1$ is the same for each of the first output waveguides 28 and 30, because of symmetry, the intensity and phase of the input light beam components in the first output waveguides 28 and 30 are equal. The part of the input light beam which is not coupled into the first output waveguides 28 and 30 exits through the output terminal 26 of the input waveguide 22 and radiates into the substrate.

The input light beam components in the first output waveguides 28 and 30, propagate through the second output waveguides 40 and 42 and are coupled from the output terminals 48 and 50 of the second output waveguides 40 and 42 into the fiber-optic loop 12. The input beams then propagate through the fiber-optic loop opposite directions.

If the interferometer is rotating with an angular velocity of $\Omega$ in the plane of the fiber-optic loop 12, then the counter-propagating beams in the fiber-optic loop 12 will have a relative Sagnac phase shift given by:

$$\phi = \frac{8\pi N A \Omega}{\lambda C} \qquad (1)$$

where $\phi$ is the Sagnac phase shift NA is the total area enclosed by the fiber-optic loop, $\lambda$ and C are the free-space wavelength and light velocity respectively of the input beam.

The phase-shifted output beams exiting the fiber-optic loop 12 are coupled into the second output waveguides 40 and 42 through the output terminals 48 and 50. Since the output beams are no longer in phase the coupling between the second output waveguides 40 and 42 in the (2×2) coupler 20 will cause the intensity of the output beams to vary as a function of $\phi$. For a (2×2) coupler 20 designed so that $K_3 L = \pi/4$ (3 dB coupler) the amplitudes of the output beams entering the (3×3) coupler 14 at the intermediate output terminals 36 and 38 are:

$$a = \frac{1}{\sqrt{2}} (1 - \sin\phi), \text{ and} \qquad (2)$$

$$b = \frac{1}{\sqrt{2}} (1 + \sin\phi). \qquad (3)$$

The intensity of the output beams continues to vary as the output beams propagate through the first output waveguides 28 and 30 of the (3×3) coupler 14 due to the coupling between the first output waveguides 28 and 30 and the input waveguide 22 and between the first output waveguides 28 and 30 themselves. The intensity of the output beams, after propagating through the (3×3) coupler 14, will depend on $K_1$, $K_2$, L and $\phi$ and may be calculated for particular values of these variables.

For a typical (3×3) coupler where $$K_2/K_1 = 0.04 \qquad (4)$$

and where the intensity of the output beams entering the first output waveguides of the (3×3) coupler are given by eqs. (2) and (3) the intensities of the output beams in the first output waveguides 28 and 30 to be measured by the photodetectors at the input terminals 32 and 34 of the (3×3) coupler 14 are:

$$\begin{aligned}P_{1,2}(\phi) = &[0.375R + 0.125 \cos 2.84KL - \\ & 0.25(1 - R)(\cos 1.36KL - \cos 1.48KL)] + \\ & \cos\phi' [-0.125r + 0.125r \cos 2.84KL] \pm \\ & \sin\phi' [0.25r \sin 1.36KL - 0.25 \sin 1.48KL]\end{aligned} \qquad (5)$$

where $K = K_1$ \qquad (6)

$$r\sqrt{(1 + \sin\phi)/(1 - \sin\phi)} \qquad (7)$$

$$R = (1 + r^2)/2 \qquad (8)$$

$$\phi' = \tan^{-1}\left(\frac{-\cos\phi}{1 + \sin\phi}\right) - \tan^{-1}\left(\frac{\sin\phi - 1}{\cos\phi}\right) \qquad (9)$$

The relationship between $K_1$ and $K_2$ expressed by eq. (4) is not critical to the operation of the present invention but is only exemplifies the operation of one embodiment. Persons of ordinary skill in the art will be able to calculate the output for other values of $K_1$ and $K_2$ utilizing the information disclosed and referenced herein.

The rate of rotation, $\Omega$, may be determined by the following steps. First, $S = (P_1 - P_2)/(P_1 + P_2)$ is plotted as a function of $\sin 2\phi$ by utilizing eq. (5). Second, the output signals of photodetectors are electronically processed to produce a signal corresponding to $S = (P_1 - P_2)/(P_1 + P_2)$. Then the measured value of S is located on the plot of S to determine $\sin 2\phi$. Finally $\Omega$ is determined utilizing eq. (1).

It is understood by persons of ordinary skill in the art that a physical embodiment of the present invention will not have the exact output values prediced by eq. (5). Any physical structure has inherent defects which require a correction factor, attainable by calibration methods well-known in the art, to be applied to the theoretical output values predicted by eq. (5).

The embodiment described above utilizes channel waveguides 56 in a dielectric substrate 58 but the present invention may also be practiced by substitution of discrete optical fibers for the channel waveguides 56 wherein the (3×3) and (2×2) couplers are realized by structures well known in the art, e.g., the fibers may be either disposed parallel to each other or be mutually twisted in a substrate such as a suitable liquid or the parallel or mutually twisted fibers may be set in epoxy.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A Sagnac ring interferometer for measuring rotation rates of the type for use with a light source for introducing an input light beam into the interferometer and photodetectors for measuring the intensity of the interferometer output beams, said interferometer comprising:

a fiber-optic loop for providing a closed optical path for two counter-propagating light beams and for providing two output beams with a relative phase shift due to rotation in the plane of the fiber-optic loop;

(3×3) optical coupling means for coupling the input light beam into the interferometer, for splitting the input light beam into two input components and for coupling the output light beams to the photodetectors; and (2×2) optical coupling means, disposed between said (3×3) coupling means and said fiber-optic loop, for coupling the input light beam components into said fiber-optic loop and for coupling the output beams from said fiber-optic loop to said (3×3) coupling means while providing for interference between the output beams.

2. The Sagnac interferometer recited in claim 1 wherein said (3×3) coupling means comprises:

two first output waveguides for receiving components of the input light beam and for guiding the output light beams to the photodetectors, each of said first output waveguides with an input terminal and an intermediate output terminal;

an input waveguide, disposed between said first output waveguides, for splitting the input light beam in said input waveguide into two input beam components in said first output waveguides, said input waveguide with an input terminal and an output terminal, wherein said input terminal of said input waveguide is adapted to receive the input light beam from a light source and said input terminals of said first output waveguides are adapted to transmit the returning output light beams from said first output waveguides to photodetectors; and wherein said (2×2) coupling means comprises:

two second output waveguides for coupling the input beam components from said first output waveguides of said (3×3) coupler to said fiber-optic loop and for coupling the output beams from said fiber-optic loop to said first output waveguides of said (3×3) coupling means while providing for interference between the output beams, each of said second output waveguides with an intermediate input terminal and an output terminal, wherein the intermediate output terminal of each of said first output waveguides is optically coupled to the intermediate input terminal of one of said second output waveguides and wherein the ends of said fiber-optic loop optically coupled between the output terminals of said second output waveguides.

3. The Sagnac interferometer recited in claim 2, wherein:

said first output waveguides are parallel to said input waveguide and;

said second output waveguides are parallel to each other.

4. The Sagnac interferometer recited in claim 3, wherein:

said input waveguide, said first output waveguides and said second output waveguides are disposed in a common plane.

5. The Sagnac interferometer recited in claim 4, wherein:

said input waveguide, said first output waveguides and said second output waveguides are symmetrically disposed about an axis, in the common plane, passing through the middle of said input waveguide.

6. The Sagnac interferometer recited in claim 5, wherein:

said input waveguide said first output waveguides and said second output waveguides are channel waveguides formed on a dielectric substrate.

7. The Sagnac interferometer recited in claim 6, wherein:

$K_1$ is the coupling co-efficient between said input waveguide and either of said first output waveguides in said (3×3) coupler;

$K_2$ is coupling co-efficient between said first output waveguides of said (3×3) coupler; and $K_1$ and $K_2$ satisfy the relationship $K_2/K_1 = 0.04$; and wherein $K_3$ is the coupling co-efficient between said second output waveguides in said (2×2) coupler;

L is the length of said (2×2) coupler; and $K_3$ and L satisfy the relationship $K_3 L = \pi/4$.

8. The Sagnac interferometer recited in claim 6 wherein:

said dielectric substrate is fabricated of $LiNbO_3$.

9. The Sagnac interferometer recited in claim 1 wherein:

said input, first output and second input waveguides are optical fibers.

* * * * *